United States Patent
Ayoub (10) Patent No.: US 10,735,894 B2
(45) Date of Patent: Aug. 4, 2020

(54) METHOD AND SYSTEM FOR DETECTION AND CREATION OF GEOFENCES

(71) Applicant: BlackBerry Limited, Waterloo (CA)

(72) Inventor: Sameh Ayoub, Ottawa (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 15/948,314

(22) Filed: Apr. 9, 2018

(65) Prior Publication Data

US 2019/0313205 A1 Oct. 10, 2019

(51) Int. Cl.
*H04W 4/021* (2018.01)
*H04W 4/38* (2018.01)
*H04W 4/029* (2018.01)
*H04W 4/35* (2018.01)
*H04W 4/44* (2018.01)

(52) U.S. Cl.
CPC ........... *H04W 4/022* (2013.01); *H04W 4/021* (2013.01); *H04W 4/029* (2018.02); *H04W 4/35* (2018.02); *H04W 4/38* (2018.02); *H04W 4/44* (2018.02)

(58) Field of Classification Search
CPC ........ H04W 4/022; H04W 4/38; H04W 4/029
USPC ......... 455/456.1, 456.3, 404.2, 422.1, 414.1, 455/418, 457
See application file for complete search history.

(56) References Cited

U.S. PATENT DOCUMENTS

| 8,018,329 | B2 | 9/2011 | Morgan et al. |
| 9,307,361 | B2 | 4/2016 | Ziskind et al. |
| 2014/0258201 | A1 | 9/2014 | Finlow-Bates |
| 2015/0023502 | A1 | 1/2015 | Li et al. |
| 2015/0126143 | A1* | 5/2015 | Van Wiemeersch ..... H04B 1/16 455/160.1 |
| 2015/0235266 | A1* | 8/2015 | Jain ..................... G06Q 30/0261 705/14.58 |
| 2016/0161274 | A1* | 6/2016 | Mach et al. ....... G01C 21/3407 701/426 |

FOREIGN PATENT DOCUMENTS

WO 2015036578 A1 3/2015

OTHER PUBLICATIONS

European Patent Office, extended European search result for application No. 19167606.3, dated Jul. 26, 2019.

* cited by examiner

*Primary Examiner* — Nghi H Ly
(74) *Attorney, Agent, or Firm* — Moffat & Co (57) ABSTRACT

A method at a network element for creating a candidate geofence, the method including receiving a message at the network element, the message including geographic coordinates and an indication of an event value; adding the event value to a running value for a geographic region associated with the geographic coordinates, creating a total value; determining that the total value exceeds a threshold; and creating the candidate geofence for the geographic area.

19 Claims, 6 Drawing Sheets

METHOD AND SYSTEM FOR DETECTION AND CREATION OF GEOFENCES

FIELD OF THE DISCLOSURE

The present disclosure relates to the transportation of goods, and in particular relates to geographic indicators for the transportation of goods.

BACKGROUND

Shipping companies may use geofences for fleet tracking and management. Geofencing is a technique for monitoring and providing an alert in response to the movement of an electronic device, such as a computing device within a vehicle or a mobile device, into or out of a prescribed area around which a geofence is defined. A geofence is thus determined with reference to a geographical area. Location data from the electronic device is compared with coordinate ranges of the geofence to determine whether the electronic device is inside or outside the geofence.

Shipping companies often maintain geofences around important places, including but not limited to storage yards, client sites, maintenance sites, rest areas, among others. When a vehicle enters or exits a geofenced area, alerts can be provided and logs created.

However, the creation of such geofenced areas is typically done manually, which may be burdensome. Further, sometimes areas that are important to the company may not be properly configured with geofences. In other cases, the company may not know about areas that may be important to geofence.

BRIEF DESCRIPTION OF THE DRAWINGS

The present disclosure will be better understood with reference to the drawings, in which.

DETAILED DESCRIPTION

The present disclosure provides a method at a network element for creating a candidate geofence, the method comprising: receiving a message at the network element, the message including geographic coordinates and an indication of an event value; adding the event value to a running value for a geographic region associated with the geographic coordinates, creating a total value; determining that the total value exceeds a threshold; and creating the candidate geofence for the geographic area.

The present disclosure further provides a network element configured for creating a candidate geofence, the network element comprising: a processor; and a communications subsystem, wherein the network element if configured to: receive a message at the network element, the message including geographic coordinates and an indication of an event value; add the event value to a running value for a geographic region associated with the geographic coordinates, creating a total value; determine that the total value exceeds a threshold; and create the candidate geofence for the geographic area.

The present disclosure further provides a computer readable medium for storing instruction code for creating a candidate geofence, which, when executed by a processor of a network element cause the network element to: receive a message at the network element, the message including geographic coordinates and an indication of an event value; add the event value to a running value for a geographic region associated with the geographic coordinates, creating a total value; determine that the total value exceeds a threshold; and create the candidate geofence for the geographic area.

Shipping companies may mark important places by defining a geofence around such a place. Important places are locations where a container or vehicle may be loaded, unloaded, stop for long periods of time, among other options.

However, sometimes containers are driven to a location or stay for long periods of time in places that the shipping company does not know about or has not configured as a geofenced area. These missing geofences could be important to the company and in accordance with the embodiments described below, systems and methods are provided for creating candidate geofences for missing or unrecorded geofenced areas.

In particular, candidate geofences can be created in accordance with the embodiments below utilizing a trigger and voting or value system. Specifically, each trigger has a value assigned to it. A network element may receive reports of trigger events and associated values for a geographic area, and when the cumulative associated values for the geographic area reach a predetermined threshold, the network element may signal to an operator or administrator that the geographic area is a candidate for a geofence.

The use of the voting or value system below allows for the creation of a candidate geofence which can be reported to operators or administrators of the system. Once these candidate geofences are converted to real geofences then tracking events can be started at such locations. Such tracking events may include, but are not limited to, the entry into the geofenced area, exit from the geofenced area, extended stays within the geofenced area, door open events within the geofenced area, door closed events within the geofence area, among other such reporting events.

Geofences may be missing for a variety of reasons. The geofence may not have been created during the initial creation of the geofenced regions for the company. This could be, for example, due to human error or based on the sheer number of geofences. For example, some companies may have thousands of geofences.

Further, a geofence may have failed to be created if a new, important location is suddenly utilized. For example, such new location may be a rest area for drivers. By creating a geofence for the new area, subsequent logging may indicate to the administrators whether a driver is wasting time within such area.

Areas that are used to transfer items, whether legitimately or illegitimately can also be marked. For example, if items are stolen from the vehicle at particular locations, then these areas may be marked as geofenced areas. A vehicle entering such area may cause an alarm at the operator based on the geofence.

Other areas that may be marked include train stations, airports, other ports, among other options.

While the embodiments described herein create geofences based on fleet operations, in other cases, geofences could be created for different industries utilizing the trigger value system described herein. The present disclosure is therefore not limited to fleet operations, but such fleet operations are merely provided as an illustration.

In vehicle operations, sensor systems may be included on the vehicle and have a plurality of sensor apparatuses operating remotely from a central monitoring station to provide remote sensor data to a management or monitoring hub. For example, one sensor system involves fleet management or cargo management systems. In fleet management or cargo management systems, sensors may be placed on a trailer, shipping container or similar product to provide a central station with information regarding the container. Such information may include, but is not limited to, information concerning the current location of the trailer or shipping container, the temperature inside the shipping container or trailer, operational parameters such as tire pressure or engine temperature, that the doors on the shipping container or trailer are closed, whether a sudden acceleration or deceleration event has occurred, the tilt angle of the trailer or shipping container, among other data.

In other embodiments the sensor apparatus may be secured to a vehicle itself. As used herein, the term vehicle can include any motorized vehicle such as a truck, tractor, car, boat, motorcycle, snow machine, among others, and can further include a trailer, shipping container or other such cargo moving container, whether attached to a motorized vehicle or not.

In accordance with the embodiments described herein, a sensor apparatus may be any apparatus or computing device that is capable of providing data or information from sensors associated with the sensor apparatus to a central monitoring or control station. Sensors associated with the sensor apparatus may either be physically part of the sensor apparatus, for example a built-in global positioning system (GPS) chipset, or may be associated with the sensor apparatus through short range wired or wireless communications. For example, a tire pressure monitor may provide information through a Bluetooth™ Low Energy (BLE) signal from the tire to the sensor apparatus. In other cases, a camera may be part of the sensor apparatus or may communicate with a sensor apparatus through wired or wireless technologies. Other examples of sensors are possible.

A central monitoring station may be any server or combination of servers that are remote from the sensor apparatus. The central monitoring station can receive data from a plurality of sensor apparatuses.

Figure 1:
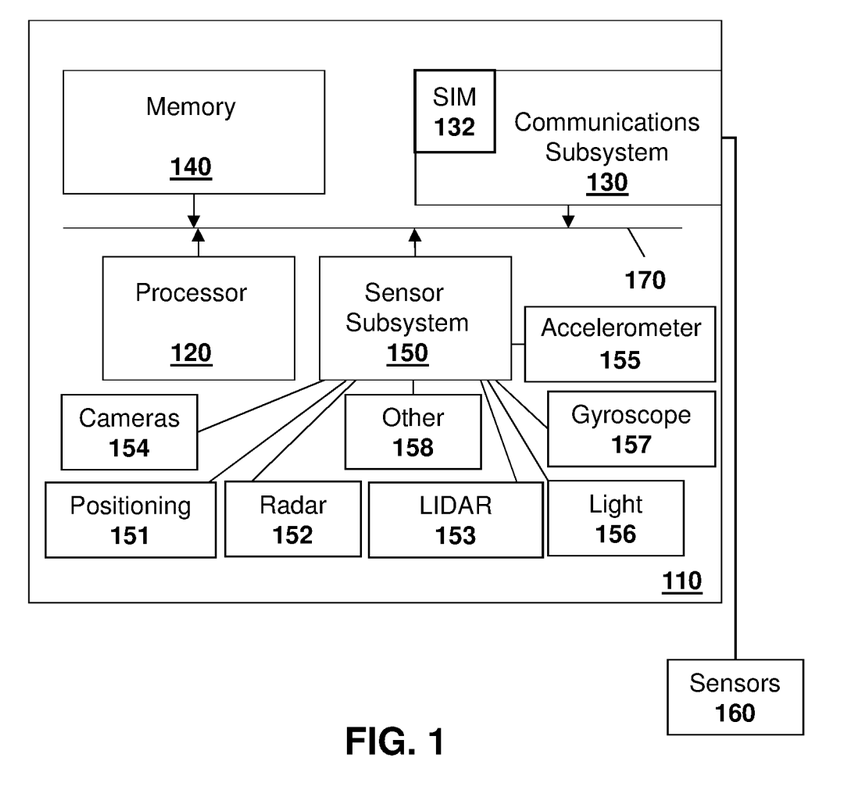
FIG. 1 is block diagram showing a computing device capable of being used in a vehicle.

One sensor apparatus is shown with regard to FIG. 1. The sensor apparatus of FIG. 1 is however merely an example and other mobile devices could equally be used in accordance with the embodiments of the present disclosure.

Reference is now made to FIG. 1, which shows an example sensor apparatus 110. Sensor apparatus 110 can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Sensor apparatus 110 comprises a processor 120 and at least one communications subsystem 130, where the processor 120 and communications subsystem 130 cooperate to perform the methods of the embodiments described herein. Communications subsystem 130 may, in some embodiments, comprise multiple subsystems, for example for different radio technologies.

Communications subsystem 130 allows sensor apparatus 110 to communicate with other devices or network elements. Communications subsystem 130 may use one or more of a variety of communications types, including but not limited to cellular, satellite, Bluetooth™, Bluetooth™ Low Energy, Wi-Fi, wireless local area network (WLAN), near field communications (NFC), ZigBee, wired connections such as Ethernet or fiber, among other options.

As such, a communications subsystem 130 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 130 will be dependent upon the communication network or communication technology on which the sensor apparatus is intended to operate.

If communications subsystem 130 operates over a cellular connection, a subscriber identity module (SIM) 132 may be provided to allow such communication. SIM 132 may be a physical card or may be virtual. In some embodiments SIM 132 may also be referred to as a universal subscriber identity module (USIM), as merely an identity module (IM), or as an embedded Universal Integrated Circuit Card (eUICC), among other options.

Processor 120 generally controls the overall operation of the sensor apparatus 110 and is configured to execute programmable logic, which may be stored, along with data, using memory 140. Memory 140 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 140, sensor apparatus 110 may access data or programmable logic from an external storage medium, for example through communications subsystem 130.

In the embodiment of FIG. 1, sensor apparatus 110 may utilize a plurality of sensors, which may either be part of sensor apparatus 110 in some embodiments or may communicate with sensor apparatus 110 in other embodiments. For internal sensors, processor 120 may receive input from a sensor subsystem 150.

Examples of sensors in the embodiment of FIG. 1 include a positioning sensor 151, a Radar 152, a LIDAR 153, one or more image sensors 154, accelerometer 155, light sensors 156, gyroscopic sensors 157, and other sensors 158. Other sensors may be any sensor that is capable of reading or obtaining data that may be useful for sensor apparatus 110. However, the sensors shown in the embodiment of FIG. 1 are merely examples, and in other embodiments different sensors or a subset of sensors shown in FIG. 1 may be used. For example, in one embodiment of the present disclosure, only a positioning sensor is provided.

The positioning sensor may use a positioning subsystem such as a Global Navigation Satellite System (GNSS) receiver which may be, for example, a Global Positioning System (GPS) receiver (e.g. in the form of a chip or chipset) for receiving GPS radio signals transmitted from one or more orbiting GPS satellites. References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system Sensors may also be external to sensor apparatus 110 and communicate with sensor apparatus 110, for example through communications subsystem 130. Such external sensors are shown in the embodiment of FIG. 1 as sensors 160. For example, sensors 160 may include tire pressor monitoring sensors that communicate with sensor apparatus 110 using Bluetooth™ Low Energy. Other examples are possible.

Further, the sensor apparatus 110 of FIG. 1 may, in some embodiments, act as a gateway, and may communicate with other sensor apparatuses (not shown) on the trailer, where the other sensor apparatuses may act as hubs for a subset of the sensors on the vehicle or trailer.

Communications between the various elements of sensor apparatus 110 may be through an internal bus 170 in one embodiment. However, other forms of communication are possible.

Sensor apparatus 110 may be affixed to any fixed or portable platform. For example, sensor apparatus 110 may be affixed to shipping containers, truck trailers, truck cabs in one embodiment. In other embodiments, sensor apparatus 110 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, sensor apparatus 110 could be carried by a user.

Such sensor apparatus 110 may be a power limited device. For example sensor apparatus 110 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 110 may utilize external power, for example from the engine of a tractor pulling the trailer, from a land power source for example on a plugged in recreational vehicle or from a building power supply, among other options.

External power may further allow for recharging of batteries to allow the sensor apparatus 110 to then operate in a power limited mode again. Recharging methods may also include other power sources, such as, but not limited to, solar, electromagnetic, acoustic or vibration charging.

The sensor apparatus from FIG. 1 may be used in a variety of environments. One example environment in which the sensor apparatus may be used is shown with regard to FIG. 2.

Figure 2:
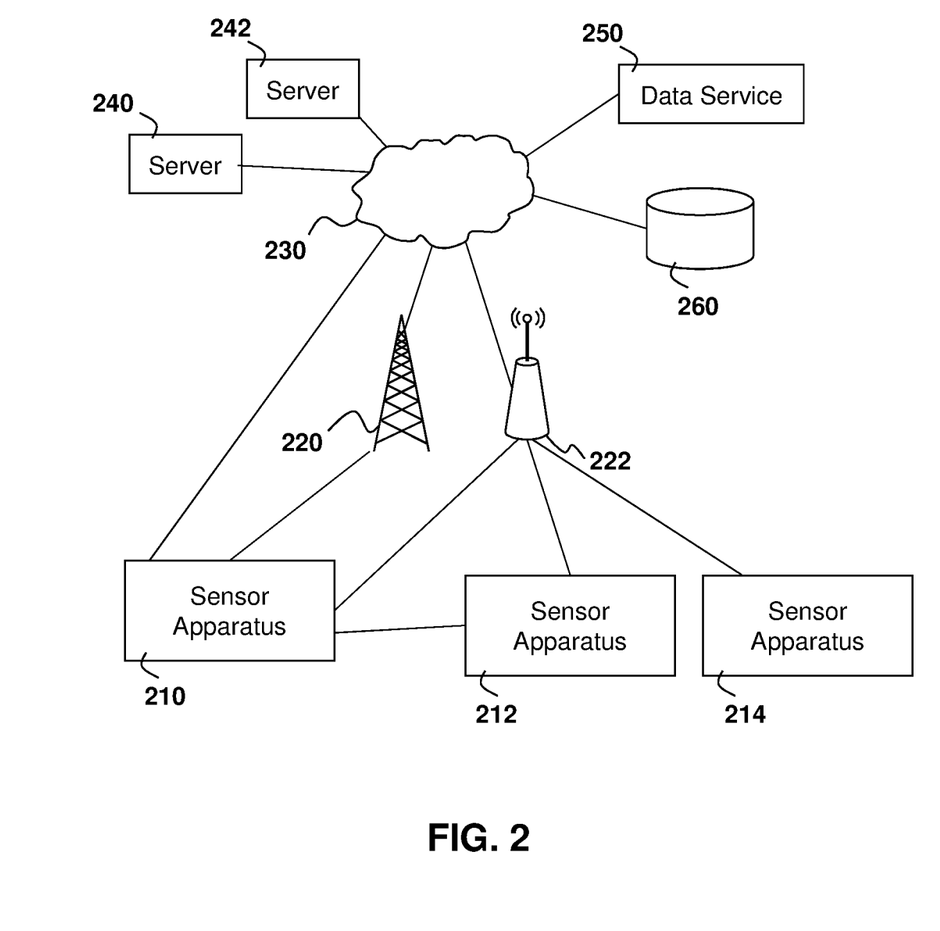
FIG. 2 is a block diagram showing an environment for the operation of the computing device of FIG. 1.

Referring to FIG. 2, three sensor apparatuses, namely sensor apparatus 210, sensor apparatus 212, and sensor apparatus 214 are provided.

In the example of FIG. 2, sensor apparatus 210 may communicate through a cellular base station 220 or through an access point 222. Access point 222 may be any wireless communication access point. For example, access point 222 may be a WiFi router or a private router network. Also, a private router network may have a path from the access point name (APN) to a server, and may reduce network latency based on a location of the sensor apparatus in some embodiments.

Further, in some embodiments, sensor apparatus 210 could communicate through a wired access point such as Ethernet or fiber, among other options.

The communication may then proceed over a wide area network such as Internet 230 and proceed to servers 240 or 242.

Similarly, sensor apparatus 212 and sensor apparatus 214 may communicate with servers 240 or server 242 through one or both of the base station 220 or access point 222, among other options for such communication.

In other embodiments, any one of sensors 210, 212 or 214 may communicate through satellite communication technology. This, for example, may be useful if the sensor apparatus is travelling to areas that are outside of cellular coverage or access point coverage.

In other embodiments, sensor apparatus 212 may be out of range of access point 222, and may communicate with sensor apparatus 210 to allow sensor apparatus 210 to act as a relay for communications.

Communication between sensor apparatus 210 and server 240 may be one directional or bidirectional. Thus, in one embodiment sensor apparatus 210 may provide information to server 240 but server 240 does not respond. In other cases, server 240 may issue commands to sensor apparatus 210 but data may be stored internally on sensor apparatus 210 until the sensor apparatus arrives at a particular location. In other cases, two-way communication may exist between sensor apparatus 210 and server 240.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 210, 212, 214, etc. For example, the server may be located essentially anywhere so long as it has network access to communicate with image capture apparatuses 210, 212, 214, etc.

Server 240 may, for example, be a fleet management centralized monitoring station. In this case, server 240 may receive information from sensor apparatuses associated with various trailers or cargo containers, providing information such as the location of such cargo containers, the temperature within such cargo containers, system information such as tire pressure or vibration sensor readings, any unusual events including sudden decelerations, temperature warnings when the temperature is either too high or too low, among other data. The server 240 may compile such information and store it for future reference. It may further alert an operator. For example, entry of the vehicle into a restricted geofenced area may provide a warning to operators.

Other examples of functionality for server 240 are possible.

In the embodiment of FIG. 2, servers 240 and 242 may further have access to third-party information or information from other servers within the network. For example, a data services provider 250 may provide information to server 240. Similarly, a data repository or database 260 may also provide information to server 240.

For example, data services provider 250 may be a subscription based service used by server 240 to obtain current road and weather conditions.

Data repository or database 260 may for example provide information such as image data associated with a particular location, aerial maps, low latency access point names, virtual SIM information, or other such information.

The types of information provided by data service provider 250 or the data repository or database 260 is not limited to the above examples and the information provided could be any data useful to server 240.

In some embodiments, information from data service provider 250 or the data repository from database 260 can be provided to one or more of sensor apparatuses 210, 212, or 214 for processing at those sensor apparatuses.

Utilizing the system from FIGS. 1 and 2 above, geofence candidate areas can be created based on the reporting from a plurality of sensor apparatuses. In particular, for each sensor apparatus, a report may be generated when certain trigger conditions occur.

Figure 3:
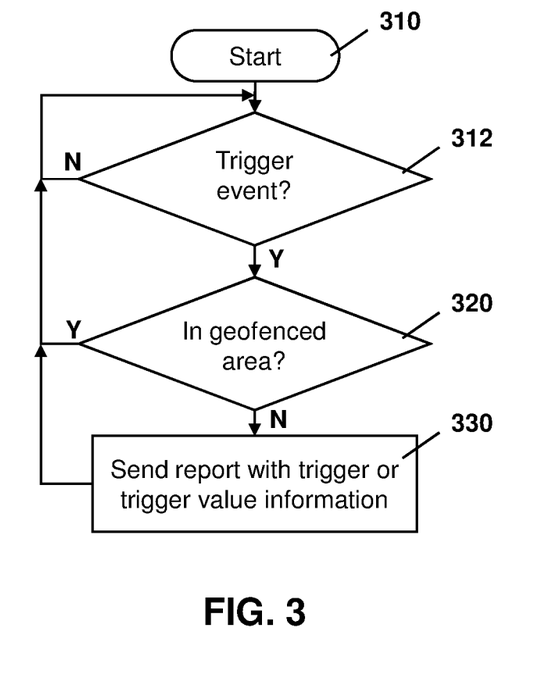
FIG. 3 is a process diagram for a process at a sensor apparatus for providing reports to a network element on detection of a trigger event.

Reference is now made to FIG. 3, which describes a process at a sensor apparatus, where such sensor apparatus could be one of many sensor apparatuses within a system.

In particular, the process of FIG. 3 starts at block 310 and proceeds to block 312 in which a check is made to determine whether a trigger condition has been met. For example, if the sensor apparatus is associated with a container, a door open or door closed event could be a trigger event. In other cases, if the container stops for a threshold period of time, this could be considered a trigger event. Further, if the sensor apparatus stops for a second period of time, where the second period of time is longer than the threshold, this could create a further trigger event indicating an extended stop.

In other cases, the trigger event could be a light level sensor within the container, a cabin overhead light within a cab of a vehicle turning on, and engine on or off event, connection to a certain network or access point, among other options.

From block 312, if the trigger has not occurred then the process continues to loop to block 312 until a trigger event is detected.

Once a trigger event is detected, the process then proceeds to block 320 in which a check is made to determine whether the sensor apparatus is within a geofenced area. If the sensor apparatus is within the geofence area, then a new candidate geofenced area does not need to be created and the process therefore proceeds back to block 312 to look for further trigger events.

Conversely, if the sensor apparatus is not within the geofenced area then the process proceeds to block 330 in which the sensor apparatus may provide a report to a network server such as server 240 from FIG. 2. The report may, in certain circumstances, provide a vote value or significance value to the trigger event. Thus, for example, in the case of a shipping container, a door open or door closed event may be worth one vote. An extended stop event which is between two threshold time periods may be worth two votes. An extended stop which exceeds the second threshold value may be worth four votes. For example, if the container is in the same spot for over 24 hours, this may be worth four votes in some cases. This is illustrated in Table 1 below.

TABLE 1

| Example Trigger Events and Vote Values | |
|---|---|
| Trigger Event | Value |
| Door open event | 1 point |
| Stop for greater than time T1 and less than time T2 | 2 points |
| Stop for greater than time T2 | 4 points |

The example of the values and trigger events in Table 1 are however merely provided for illustration. The actual system could be configured and the voting values configured based on the needs of the shipping company or network operators.

In other cases, trigger values can be assigned at the network element itself. In this case, the report at block 330 may simply include details about the trigger event.

From block 330, the process may then proceed back to block 312 in which a further trigger event is sought. As will be appreciated by those in the art, the further trigger event will differ from the trigger event that caused the report at block 330 in order to ensure that the same event does not create multiple votes. Thus, for example, if a vehicle is stopped, it will not constantly generate reports 330 unless certain threshold time periods are met. Thus, for example, if the trigger is a stop for a first time period T1, then this could be reported at block 330. The sensor apparatus would then not provide another report until the second threshold time period T2 is met, at which point a second report at block 330 could be provided to the network element. The network element could then replace the first report with the second report if the second report has a higher time value.

In other cases, the second report could simply provide the delta of the votes. Thus, for example, if the stopping between a first time period T1 and a second time period is worth two points or votes, and the stopping above the second time period T2 is worth four points or votes, then the second report at block 330 could simply include two points or votes as the delta from the first report to the second report.

Other examples are possible.

Further, in alternative embodiments, step 320 may be optional. For example, the sensor apparatus may not be aware of geofenced areas. In this case, the process would proceed from block 312 directly to block 330. Further, the network element could then filter messages based on whether the geographic coordinates in the message are within an existing geofenced area or not.

Utilizing the process of FIG. 3, a plurality of sensor apparatuses could be providing reports to a network element. From the perspective of the network element, reference is now made to FIG. 4.

Figure 4:
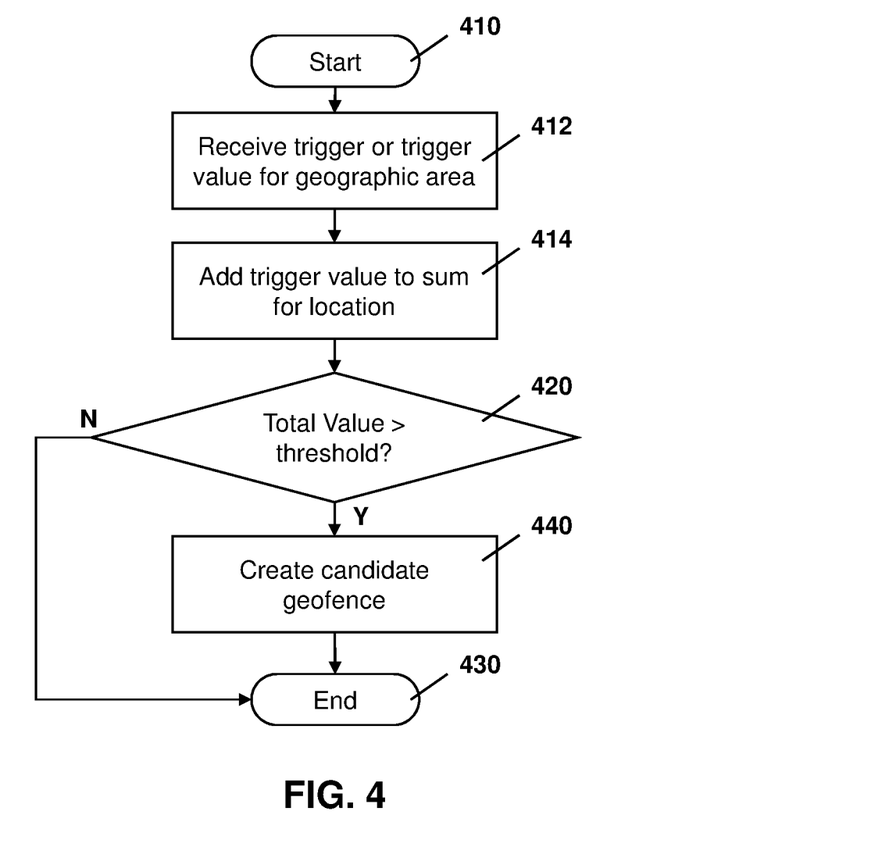
FIG. 4 is a process diagram for a process at a network element for creating candidate geofences.

The process of FIG. 4 starts at block 410 and proceeds to block 412. At block 412, the network element receives a vote report. Such vote report may be the vote report from block 330 of FIG. 3. In particular, the message received at block 412 could include geography coordinates. The message at block 412 could further include a vote value or could merely include the trigger event that caused the message to be sent. If the message merely includes the trigger event, the network element could look up, for example in a lookup table on the network element, the value associated with the trigger.

From block 412, the process may then proceed to block 414. At block 414, the value received in the message of block 412, or derived from the trigger event received at block 412, may then be added to a running sum of trigger values for the particular geographic location. For example, the geographic coordinates that are provided within message 412 may be used to look up whether trigger events or votes have been previously received from the geographic region. The lookup can use a certain threshold distance from the reported geographic coordinates to find previous values. For example, a distance such as 50 meters from such location may be used in order to determine whether to add values to a running sum. If yes, then the trigger value that is received at, or derived from, message 412 is then added to the running sum in order to derive a total value for the location.

The process then proceeds to block 420 in which a check is made to determine whether the total value for a particular location exceeds a threshold value. For example, if a plurality of votes have been received for a particular geographic region, and if the vote value exceeds a threshold such as 50 votes or points, then this may be a candidate geofence location. Thus, from block 420, if the total value does not exceed the threshold then the process proceeds to block 430 and ends.

Conversely, if the total value for the location exceeds the threshold then the process proceeds to block 440 in which a candidate geofenced area is created. The candidate geofenced area may, for example, be provided in a report or alert to an administrator, who may then decide whether or not to change the candidate geofenced area into an active geofenced area within the system.

From block 440 the process proceeds to block 430 and ends.

As will be appreciated by those in the art, the addition of the values at block 420 may depend on geographic boundaries. Thus, if a plurality of votes is received within an area, for example with a radius of 100 m, this may indicate that these values should be added together. If, however, a vote is received for an area that is outside of this region then the vote would not be counted for the geofenced area. Other options are possible.

Further, in some cases, votes may have a time period for which they are valid. Thus, for example, if a vote was received more than six months ago, this may not be counted towards the threshold value, as the site is not visited often enough to create a geofenced area. In this case, the total value at block 420 would not include the stale votes.

Figure 5:
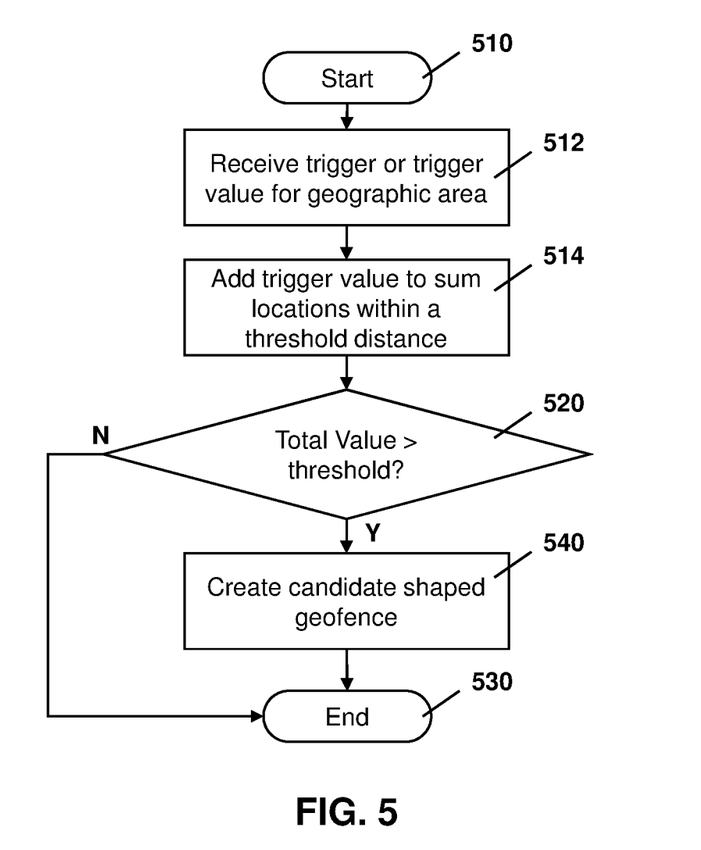
FIG. 5 is a process diagram for a process at a network element for creating candidate geofences shaped to capture geographic points at which trigger events have occurred.

Further, the votes may be used to provide a shape for the geofence. Reference is now made to FIG. 5.

In particular, the process of FIG. 5 starts at block 510 and proceeds to block 512 in which the network element receives a message from one of a plurality of sensor apparatuses. The message includes a geographic point as well as either a trigger value or a trigger event.

The process then proceeds to block 514 in which the network element may compile nearby votes within a threshold distance. For example, if two votes are received within 100 m of each other, these votes can be merged and the geofenced area may be shaped to surround such votes. Thus, at block 514, a compilation of votes within a geographic area could be made to create a shaped geofenced area. Similarly, a scatter graph or other similar pattern for the trigger events that are being added to the total value could be used to determine a shape of a candidate geofenced area.

The process then proceeds to block 520 in which a check is made to determine whether the shaped geofenced area created at block 514 has a threshold number of votes. If not, the process may proceed to block 530 and end.

If conversely the number of votes is greater than the threshold then the process proceeds from block 520 to block 540 in which a shaped geofenced area is then provided as a candidate to the administrator.

From block 540 the process then proceeds to block 530 ends.

Various factors or thresholds in the embodiments above can be configured by network operators. These include the value or points associated with each trigger condition, the threshold value used to create a candidate geofenced area, the threshold distance between the reporting areas which can be combined together, among other such data. Such thresholds could be set by the network operator in order to provide a system which meets such operator's needs.

As indicated above, once a candidate geofenced area is created, such candidate geofenced area may be converted to an actual geofenced area by a system administrator or operator in order to then provide for reporting on when sensor apparatuses enter and exit such areas. This can provide better visibility and control over a shipping network, among other options.

A server such as servers 240, 242 or 250 may be any network node. For example, one simplified server that may perform the embodiments described above is provided with regards to FIG. 6.

Figure 6:
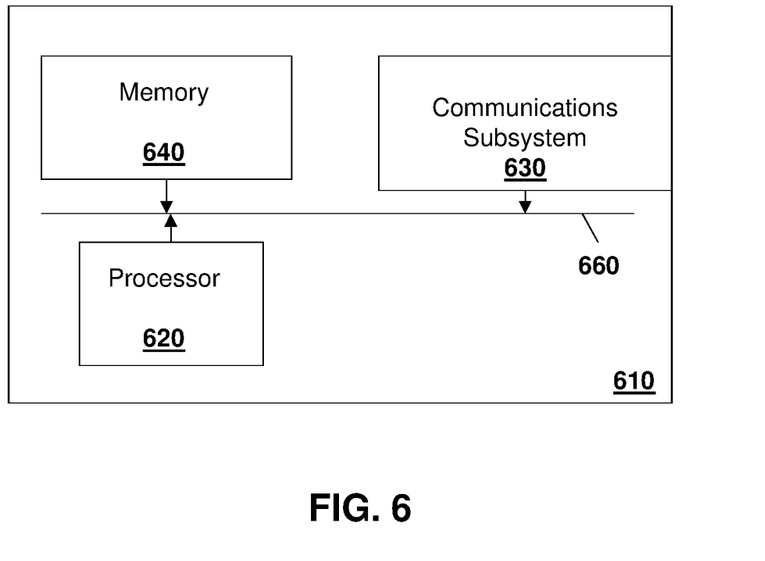
FIG. 6 is a block diagram of an example computing device capable of being used in accordance with the embodiments of the present disclosure.

In FIG. 6, server 610 includes a processor 620 and a communications subsystem 630, where the processor 620 and communications subsystem 630 cooperate to perform the methods of the embodiments described herein.

The processor 620 is configured to execute programmable logic, which may be stored, along with data, on the server 610, and is shown in the example of FIG. 6 as memory 640. The memory 640 can be any tangible, non-transitory computer readable storage medium, such as optical (e.g., CD, DVD, etc.), magnetic (e.g., tape), flash drive, hard drive, or other memory known in the art. In one embodiment, processor 620 may also be implemented entirely in hardware and not require any stored program to execute logic functions.

Alternatively, or in addition to the memory 640, the server 610 may access data or programmable logic from an external storage medium, for example through the communications subsystem 630.

The communications subsystem 630 allows the server 610 to communicate with other devices or network elements.

Communications between the various elements of the server 610 may be through an internal bus 660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In particular, the present disclosure may include the embodiments of the following clauses:

AA. A method at a network element for creating a candidate geofence, the method comprising: receiving a message at the network element, the message including geographic coordinates and an indication of an event value; adding the event value to a running value for a geographic region associated with the geographic coordinates, creating a total value; determining that the total value exceeds a threshold; and creating the candidate geofence for the geographic area.

BB. The method of clause AA, wherein the event value is explicitly provided in the message.

CC. The method of clause AA or clause BB, wherein the event value is implicitly provided in the message by having an event description in the message and the event value associated with the event description stored at the network element.

DD. The method of any one of clauses AA to CC, wherein the geographic region comprises an area within a threshold distance of the geographic coordinates.

EE. The method of any one of clauses AA to DD, wherein the event value is based on a trigger event at a sender of the message.

FF. The method of clause EE, wherein the sender is associated with a container or vehicle, and wherein the trigger event is one of: a door open event; a door closed event; a stopping of the container or vehicle for at least a first time; a stopping of the container or vehicle for at least a second time, the second time being longer than the first time; an engine start event; an engine stop event; a light sensing event; or a cab light event.

GG. The method of any one of clauses AA to FF, further comprising: creating a report or alert by the network element regarding the creation of the candidate geofence.

HH. The method of any one of clauses AA to GG, wherein the creating utilizes a plurality of geographic coordinates to create a shape for the candidate geofence.

II. The method of clause HH, wherein the shape includes all received geographic coordinates within a threshold distance of each other.

JJ. A network element configured for creating a candidate geofence, the network element comprising: a processor; and a communications subsystem, wherein the network element if configured to: receive a message at the network element, the message including geographic coordinates and an indication of an event value; add the event value to a running value for a geographic region associated with the geographic coordinates, creating a total value; determine that the total value exceeds a threshold; and create the candidate geofence for the geographic area.

KK. The network element of clause JJ, wherein the event value is explicitly provided in the message.

LL. The network element of clause JJ or clause KK, wherein the event value is implicitly provided in the message by having an event description in the message and the event value associated with the event description stored at the network element.

MM. The network element of any one of clauses JJ to LL, wherein the geographic region comprises an area within a threshold distance of the geographic coordinates.

NN. The network element of any one of clauses JJ to MM, wherein the event value is based on a trigger event at a sender of the message.

OO. The network element of clause NN, wherein the sender is associated with a container or vehicle, and wherein the trigger event is one of: a door open event; a door closed event; a stopping of the container or vehicle for at least a first time; a stopping of the container or vehicle for at least a second time, the second time being longer than the first time; an engine start event; an engine stop event; a light sensing event; or a cab light event.

PP. The network element of any one of clauses JJ to OO, wherein the network element is further configured to: create a report or alert by the network element regarding the creation of the candidate geofence.

QQ. The network element of any one of clauses JJ to PP, wherein the network element is configured to create by using a plurality of geographic points to create a shape for the candidate geofence.

RR. The network element of clause QQ, wherein the shape includes all received geographic coordinates within a threshold distance of each other.

SS. A computer readable medium for storing instruction code for creating a candidate geofence, which, when executed by a processor of a network element cause the network element to: receive a message at the network element, the message including geographic coordinates and an indication of an event value; add the event value to a running value for a geographic region associated with the geographic coordinates, creating a total value; determine that the total value exceeds a threshold; and create the candidate geofence for the geographic area.

The invention claimed is:

1. A method at a network node for creating a candidate geofence, the method comprising:
    receiving a message at the network node, the message including geographic coordinates and an indication of an event value, the event value corresponding to an assigned significance of an event associated with the geographic coordinates, the event value being greater for events of greater significance, and the event value being lower for events of lower significance;
    adding the event value to a running value for a geographic region associated with the geographic coordinates, creating a total value;
    determining that the total value exceeds a threshold; and
    creating the candidate geofence for the geographic area.

2. The method of claim 1, wherein the event value is explicitly provided in the message.

3. The method of claim 1, wherein the event value is implicitly provided in the message by having an event description in the message and the event value associated with the event description stored at the network node.

4. The method of claim 1, wherein the geographic region comprises an area within a threshold distance of the geographic coordinates.

5. The method of claim 1 wherein the event value is based on a trigger event at a sender of the message.

6. The method of claim 5, wherein the sender is associated with a container or vehicle, and wherein the trigger event is one of: a door open event; a door closed event; a stopping of the container or vehicle for at least a first time; a stopping of the container or vehicle for at least a second time, the second time being longer than the first time; an engine start event; an engine stop event; a light sensing event; or a cab light event.

7. The method of claim 1, further comprising:
    creating a report or alert by the network node regarding the creation of the candidate geofence.

8. The method of claim 1, wherein the creating utilizes a plurality of geographic coordinates to create a shape for the candidate geofence.

9. The method of claim 8, wherein the shape includes all received geographic coordinates within a threshold distance of each other.

10. A network node configured for creating a candidate geofence, the network node comprising:
    a processor; and
    a communications subsystem,
    wherein the network node is configured to:
    receive a message at the network node, the message including geographic coordinates and an indication of an event value, the event value corresponding to an assigned significance of an event associated with the geographic coordinates, the event value being greater for events of greater significance, and the event value being lower for events of lower significance;
    add the event value to a running value for a geographic region associated with the geographic coordinates, creating a total value;
    determine that the total value exceeds a threshold; and
    create the candidate geofence for the geographic area.

11. The network node of claim 10, wherein the event value is explicitly provided in the message.

12. The network node of claim 10, wherein the event value is implicitly provided in the message by having an event description in the message and the event value associated with the event description stored at the network node.

13. The network node of claim 10, wherein the geographic region comprises an area within a threshold distance of the geographic coordinates.

14. The network node of claim 10, wherein the event value is based on a trigger event at a sender of the message.

15. The network node of claim 14, wherein the sender is associated with a container or vehicle, and wherein the trigger event is one of: a door open event; a door closed event; a stopping of the container or vehicle for at least a first time; a stopping of the container or vehicle for at least a second time, the second time being longer than the first time; an engine start event; an engine stop event; a light sensing event; or a cab light event.

16. The network node of claim 10, wherein the network node is further configured to:

create a report or alert by the network node regarding the creation of the candidate geofence.

17. The network node of claim 10, wherein the network node is configured to create by using a plurality of geographic points to create a shape for the candidate geofence.

18. The network node of claim 17, wherein the shape includes all received geographic coordinates within a threshold distance of each other.

19. A non-transitory computer readable medium for storing instruction code for creating a candidate geofence, which, when executed by a processor of a network node cause the network node to:

receive a message at the network node, the message including geographic coordinates and an indication of an event value, the event value corresponding to an assigned significance of an event associated with the geographic coordinates, the event value being greater for events of greater significance, and the event value being lower for events of lower significance;

add the event value to a running value for a geographic region associated with the geographic coordinates, creating a total value;

determine that the total value exceeds a threshold; and create the candidate geofence for the geographic area.

* * * * *